Patented Apr. 4, 1939

2,152,827

UNITED STATES PATENT OFFICE 2,152,827

PROCESS OF PREPARING SUBSTANCES BELONGING TO THE FLAVONE GROUP

Albert Szent-Györgyi, Szeged, Hungary, assignor, by mesne assignments, to Winthrop Chemical Company, Inc., New York, N. Y., a corporation of New York No Drawing. Application June 29, 1937, Serial No. 151,027. In Hungary July 7, 1936

6 Claims. (Cl. 260—333)

The present invention relates to a process of preparing substances belonging to the flavone group.

Certain plants, for instance capsicum or citrus fruits, such as bitter oranges or lemons contain glucoside-like substances belonging to the flavone group (hydroxy-flavones, hydroxy-hydroflavones and others); the chemical structure of these substances is not yet completely understood and they have vitamin-like properties. By the hitherto known processes of preparing substances of this chemical group from plants only in some cases pure products are obtained, whereas in most cases the final products obtained are extremely impure; they, therefore, cannot be used for pharmaceutical purposes.

Now I have found that the said substances may be prepared in a form substantially purer than hitherto usual as follows:

From the solution prepared from the plants by any extraction process with alcohol or other organic solvents miscible with water the flavone derivative to be prepared is precipitated with the hydroxides of alkali metals or alkaline earth metals and the precipitate obtained is decomposed by means of an acid. For this purpose every organic or inorganic acid may be used, the acidity of which is stronger than that of the flavone compound, for instance hydrochloric acid or acetic acid. This decomposition may be performed in various ways: The precipitate may, for instance, be suspended in an organic solvent miscible with water and the suspension may then be decomposed by means of an acid. During this operation the alkali metal salt or the salt of the alkaline earth metal of the acid added is distinctly separated, whereas the flavone derivative dissolves. It may also be advantageous to decompose the precipitate in an aqueous solution. The precipitation with the hydroxides of an alkali metal or an alkaline earth metal may, however, only be performed from an organic solvent miscible with water, because the precipitate is only produced in said solvents, but is soluble in water. As organic solvents miscible with water there may be used for instance acetone or alcohol, particularly low aliphatic alcohols, such as ethyl alcohol or methyl alcohol. The solvents need not be entirely anhydrous; it is merely necessary that the formation of a precipitate is not prevented.

The raw extract prepared from plants containing flavone is suitably at first freed in known manner from the impurities by use of solutions of heavy metal salts, for instance lead acetate. For this purpose the dissolved heavy metal salt, for instance lead acetate is added to the plant extract first in an acid medium; the solution of the heavy metal salt is then again added to the solution which has been rendered alkaline, for instance with ammonia, whereby the flavonate of the heavy metal is separated. This flavonate is then further treated in an aqueous or, for instance alcoholic supension. If the supension in water as dispersing liquid is decomposed with an acid stronger than is the flavone, for instance hydrogen sulfide, the aqueous flavone solution which remains after the heavy metal salt has been separated is suitably concentrated to such an extent that the impurities are precipitated by the addition of the organic solvent and that the solution is sufficiently anhydrous for the separation of the flavone by the action of the hydroxides of the alkali metal or alkaline earth metal. But when the precipitate of flavonate obtained by means of lead acetate and suspended in an organic solvent is worked up, the flavone remaining in the solution may directly be precipitated after the lead has been separated with an acid stronger than is the flavone.

The following examples serve to illustrate the invention, but they are not intended to limit it thereto:

1. 150 kilos of fresh lemon-peels are passed through a meat-chopping machine and the ground material is stirred for one night together with 150 liters of alcohol of about 90 per cent. strength. The following day the mass is pressed out by means of a fruit press, the residue is again extracted with 75 liters of alcohol and the combined pressed juices are mixed with 2 per cent. of barium acetate. The precipitated product is centrifuged. 1 per cent of lead acetate is then added to the clear solution which is rendered distinctly alkaline by means of ammonia. The precipitated product which has been centrifuged is finely suspended in 10 liters of acetic acid of 5 per cent. strength and the suspension is neutralized with ammonia, while vigorously stirring, and then strongly centrifuged. The precipitated product obtained is suspended in 10 liters of absolute alcohol and the suspension is mixed, while stirring and cooling it, with concentrated sulfuric acid until the reaction is acid to Congo paper. The precipitated product is separated, washed with alcohol and then removed.

The solution is then neutralized, while vigorously stirring, by carefully adding alcoholic caustic soda solution until the reaction is neutral to methyl red. After the solution has been allowed to stand for some time, it is poured off from the resinous precipitate. This precipitate, still containing a certain amount of flavone derivatives, is dissolved in 150 cc. of water; the solution is then brought again to a neutral reaction to methyl red and mixed with 1 liter of alcohol. The precipitate thus obtained is again separated and removed; the clear solution is mixed with the solution obtained by the first neutralization; the combined solutions are then cooled over night to —15° C. They are then decanted into a vessel cooled to —15° C. and further mixed, while vigorously stirring, with alcoholic caustic soda solution which is added as a fine jet until phenolphthalein assumes a strong red color when coming in contact with the solution. The precipitate is immediately centrifuged with application of nitrogen and then taken up in n-hydrochloric acid. The solution so obtained is mixed with bicarbonate until the reaction is negative to Congo paper. When the solution is allowed to stand, part of the flavone separates, the remaining solution is colorimetrically adjusted to a certain content, filtered under sterile conditions and filled into ampules.

A further quantity of flavone may be obtained from the neutral precipitate obtained on cooling it to —15° C. by absorption in water, precipitation with alcohol and further treatment of the solution as described above.

2. 100 kilos of bitter orange-peels freed from the outer yellow and oil-containing layer are passed through a meat-chopping machine and the ground mass is extracted, while heating, with 200 liters and then again with 100 liters of absolute alcohol. The combined extracts are rendered neutral to methyl red and then cooled. By a further treatment according to the last steps described in Example 1, that is low cooling and precipitation with alcoholic caustic soda solution a sufficiently pure product is obtained without a precipitation with lead.

I claim:

1. The process which comprises extracting vegetable material containing substances belonging to the flavone group by means of an organic solvent miscible with water, adding to the extract the hydroxide of a metal of the group consisting of alkali metals or alkaline earth metals and decomposing the precipitate thus formed by means of an acid.

2. The process which comprises extracting vegetable material containing substances belonging to the flavone group by means of an organic solvent miscible with water, acidifying the extract and precipitating it with a heavy metal salt, rendering alkaline the solution separated from the precipitate, suspending the precipitate thus produced in an organic solvent miscible with water and separating the heavy metal from the suspension by the addition of an acid, adding to the solution the hydroxide of a metal of the group consisting of alkali metals or alkaline earth metals and decomposing the precipitate thus formed by means of an acid.

3. The process which comprises extracting vegetable material containing substances belonging to the flavone group by means of an organic solvent miscible with water, acidifying the extract and precipitating it with lead acetate, rendering alkaline by means of ammonia the solution separated from the precipitate, suspending the precipitate thus produced in an organic solvent miscible with water and separating the lead acetate from the suspension by the addition of an acid, adding to the solution the hydroxide of a metal of the group consisting of alkali metals and alkaline earth metals and decomposing the precipitate thus formed by means of an acid.

4. The process which comprises extracting ground lemon-peels containing substances belonging to the flavone group by means of an organic solvent miscible with water, adding to the extract the hydroxide of a metal of the group consisting of alkali metals and alkaline earth metals and decomposing the precipitate thus formed by means of an acid.

5. The process which comprises extracting ground lemon peels containing substances belonging to the flavone group by means of an organic solvent miscible with water, acidifying the extract and precipitating it with a heavy metal salt, rendering alkaline the solution separated from the precipitate, suspending the precipitate thus produced in an organic solvent miscible with water and separating the heavy metal from the suspension by the addition of an acid, adding to the solution the hydoxide of a metal of the group consisting of alkali metals or alkaline earth metals and decomposing the precipitate thus formed by means of an acid.

6. The process which comprises extracting ground lemon peels containing substances belonging to the flavone group by means of an organic solvent miscible with water, acidifying the extract and precipitating it with lead acetate, rendering alkaline by means of ammonia the solution separated from the precipitate, suspending the precipitate thus produced in an organic solvent miscible with water and separating the lead acetate from the suspension by the addition of an acid, adding to the solution the hydroxide of a metal of the group consisting of alkali metals and alkaline earth metals and decomposing the precipitate thus formed by means of an acid.

ALBERT SZENT-GYÖRGYI.